United States Patent [19]
Chalmers et al.

[11] 3,932,798
[45] Jan. 13, 1976

[54] ELECTRICAL INVERTER CIRCUIT

[75] Inventors: Brian John Chalmers, Bramhall; John Philip Gibson, Longsight, both of England

[73] Assignee: C.A.V. Limited, Birmingham, England

[22] Filed: Dec. 5, 1974

[21] Appl. No.: 529,753

[30] Foreign Application Priority Data
Dec. 22, 1973 United Kingdom............ 59680/73

[52] U.S. Cl. ............................ 321/45 C; 307/252 M
[51] Int. Cl.² ........................................ H02M 7/515
[58] Field of Search .......... 307/252 M; 321/5, 45 C, 321/45 ER

[56] References Cited
UNITED STATES PATENTS

| | | | |
|---|---|---|---|
| 3,213,287 | 10/1965 | King................................. | 321/45 C |
| 3,219,905 | 11/1965 | Davis et al. ..................... | 321/45 C |
| 3,340,453 | 9/1967 | Bradley et al..................... | 321/45 C |
| 3,355,654 | 11/1967 | Risberg........................... | 321/45 ER |
| 3,568,021 | 3/1971 | Turnbull .......................... | 321/45 C |
| 3,683,264 | 8/1972 | Schieman et al............. | 321/45 C X |

FOREIGN PATENTS OR APPLICATIONS
250,277   6/1970   U.S.S.R.......................... 321/45 C

OTHER PUBLICATIONS
Electronic Industries, Oct., 1964, pp. 38–40.

*Primary Examiner*—William M. Shoop

[57] ABSTRACT

An electrical inverter comprises positive and negative supply lines, first and second thyristors the anodes of which are connected to the positive line and the cathodes of which are connected respectively to the anodes of third and fourth thyristors. An oscillatory commutating circuit including a capacitor and an inductor is provided and which is connected between the anodes of the third and fourth thyristors and also a firing circuit is provided to provide gate signals to the first, fourth, third and second thyristors in that order. In addition, means is provided to over-damp the oscillatory circuit thereby to limit the commutating voltage.

4 Claims, 4 Drawing Figures

ELECTRICAL INVERTER CIRCUIT

This invention relates to inverters.

An inverter according to the invention comprises in combination positive and negative supply lines, first and second thyristors having their anodes connected to the positive line and their cathodes connected respectively to the anodes of third and fourth thyristors the cathodes of which are connected to the negative line, an oscillatory commutating circuit connected between the anodes of the third and fourth thyristors, a firing circuit providing gate signals to the first, fourth, third and second thyristors in that order, and means for over damping the oscillatory circuit.

Figure 1:
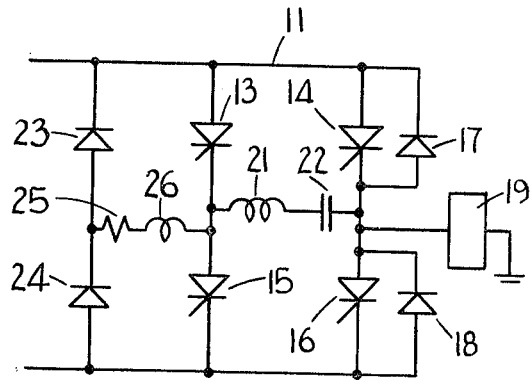
FIG. 1 is a circuit diagram illustrating one example of the invention.

Referring to FIG. 1, there are provided positive and negative supply lines 11, 12, the line 11 having connected thereto the anodes of a pair of thyristors 13, 14 having their cathodes connected to the anodes of thyristors 15, 16 respectively. The cathodes of the thyristors 15, 16 are connected to the line 12. The anode-cathode paths of the thyristors 14 and 16 are bridged by the cathode-anode paths of diodes 17 and 18 respectively, the anode of the thyristor 16 is connected through a load 19 fed by the inverter to a point at a potential intermediate the lines 11, 12 and the anodes of the thyristors 15, 16 are interconnected through an oscillatory commutating circuit comprising an inductor 21 and a capacitor 22 in series.

The arrangement thus far described is known and operates in the following manner. Consider a point in the cycle at which the thyristor 14 is conducting and feeding the load 19, then previously the capacitor 22 will have been charged with its right-hand plate positive. At a later point in the cycle the thyristor 13 is fired, discharging the capacitor 22 resonantly to turn off the thyristor 14. Shortly afterwards, the thyristor 16 is fired, and the load 19 is fed through the thyristor 16 or diode 18. The capacitor 22 now completes charging through the thyristor 13 and the thyristor 16 or the load and the thyristor 13 then turns off. Later in the cycle, the thyristor 15 is fired to turn off the thyristor 16, and shortly afterwards the thyristor 14 is fired again and the load 19 being fed through the thyristor 14 or the diode 17. The capacitor 22 completes charging through the thyristor 15 and the thyristor 14 or the load, the thyristor 15 turns off and the cycle is then repeated.

Using such an arrangement, the capacitor 22 charges to substantially above the voltage between the lines 11, 12, and in some arrangements this can be a disadvantage, because the thyristors 13 and 15 and the capacitor 22 must be rated for this elevated voltage, and furthermore, the full commutation ability of the circuit is not available when the circuit is first switched on.

Figure 3:
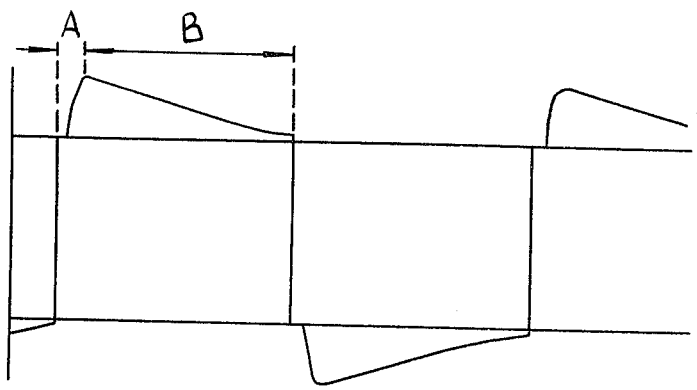
FIG. 3 illustrates a waveform obtained with the circuits of FIG. 1 or FIG. 2.

In order to overcome this problem, the oscillatory commutation circuit is over damped at the end of each commutation. This can be achieved in a number of ways, but in FIG. 1, the lines 11, 12 are interconnected through the cathode-anode paths of a pair of diodes 23, 24 in series, the junction of the diodes 23, 24 being connected to the anode of the thyristor 15 through a resistor 25 and an inductor 26 in series. In many circuits the inductor 26 is not necessary, and FIG. 3 shows the waveform obtained with the arrangement of FIG. 1 where the inductor 26 is omitted. As will be seen in FIG. 3, during the commutation interval 'A' the capacitor 22 charges to a voltage in excess of the supply voltage. During the interval 'B', the over damping causes the capacitor voltage to reduce to a value in excess of the supply voltage by a chosen amount in a given time. It should be noted that it is extremely important that the oscillatory commutating circuit is over damped at the end of each commutation, as distinct from being under damped. Under damping would cause an oscillatory discharge of the capacitor 22 during the period 'B', and it would then be possible to trap on the capacitor 22 a charge at a voltage less than the supply voltage, which of course would mean that the circuit could possibly fail to commutate.

Figure 2:
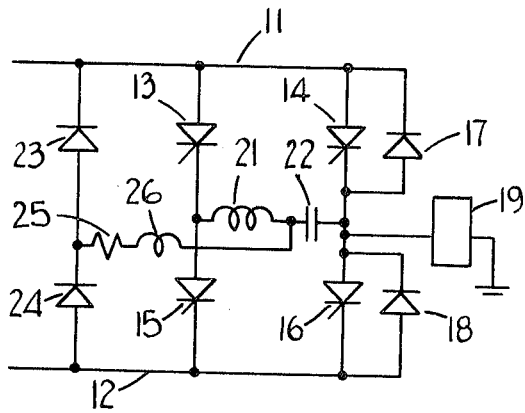
FIG. 2 illustrates a modification of the arrangement shown in FIG. 1.

The arrangement of FIG. 2 is similar to that off FIG. 1, the series circuit 25, 26 now being returned to the junction of the inductor 21 and capacitor 22. The operation is unaffected.

Figure 4:
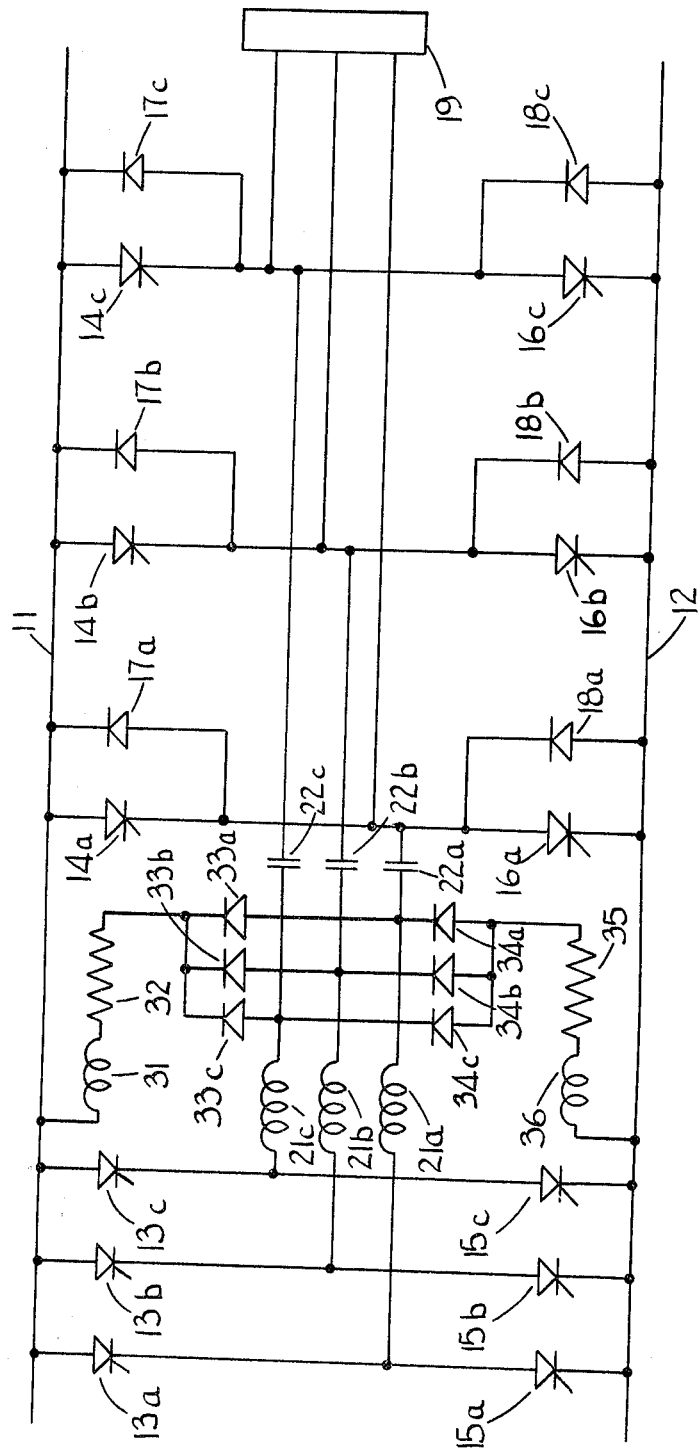
FIG. 4 illustrates another example as applied to a three phase inverter.

Referring now to FIG. 4, a three phase inverter feeding a load 19 in the form of a motor is shown. Apart from the over damping circuit, the inverter is the same as that shown in FIG. 1 and FIG. 2 in triplicate. The three phases have been indicated by the same reference numerals as in FIGS. 1 and 2 but with the suffixes a, b and c. The over damping circuit comprises an inductor 31 and a resistor 32 connected in series between the line 11 and the cathodes of three diodes 33a, 33b and 33c. The anodes of the diodes 33a, 33b, 33c are connected respectively to the junctions of the capacitors 22a, 22b, 22c and their respective inductors 21a, 21b, 21c, and are further connected to the cathodes of three diodes 34a, 34b and 34c. The diodes 34a, 34b and 34c have their anodes connected through a resistor 35 and inductor 36 in series to the line 12. The circuit operates in exactly the same way as FIG. 1 and FIG. 2, and it will be seen that two inductors 31, 36 and two resistors 32, 35 are needed, rather than three if the arrangements of FIG. 1 and FIG. 2 were merely triplicated. As in FIG. 1 and FIG. 2, the inductors 36 and 31 are not always necessary.

It will be appreciated that the components in FIG. 4 can be arranged in a number of ways to achieve the desired effect. For example the junctions of the two associated pairs of thyristors could be connected through the capacitor and inductor in series with the junction of the associated pair of diodes being connected to the junction of the thyristors 13a, 15a.

Moreover, it is common in inverter circuits to employ suppressors to control the rate of rise of voltage and/or current at various points in the inverter. Although such suppressors may be important in some applications, they are not important to an understanding of the present invention, and so are not described.

We claim:

1. An electrical inverter comprising in combination positive and negative supply lines, first and second thyristors having their anodes connected to the positive line and their cathodes connected respectively to the anodes of third and fourth thyristors the cathodes of which are connected to the negative line, an oscillatory commutating circuit connected between the anodes of the third and fourth thyristors and comprising a capacitor and an inductor connected in series, a firing circuit providing gate signals to the first, fourth, third and second thyristors in that order, and means for over damping the oscillator circuit, comprising a resistor which effects a reduction in the voltage of the capacitor during the intervals between commutations, means for electrically connecting one end of said resistor to one or the other of said supply lines during the intervals between commutations, said last-mentioned means comprising a pair of diodes connected in series across said supply lines, the other end of said resistor being connected to a point intermediate said inductor and capacitor.

2. An electrical inverter as claimed in claim 1 including a further inductor connected in series with said resistor.

3. An electrical inverter circuit for supplying a three phase load, the inverter circuit comprising three inverters, each inverter comprising in combination positive and negative supply lines, first and second thyristors having their anodes connected to the positive line and their cathodes connected respectively to the anodes of third and fourth thyristors the cathodes of which are connected to the negative line, an oscillatory commutating circuit connected between the anodes of the third and fourth thyristors, a firing circuit providing gate signals to the first, fourth, third and second thyristors in that order, and means for over damping the oscillatory circuit, the oscillatory commutating circuits each comprising a capacitor connected in series with an inductor, and the means for damping the oscillatory circuits including two sets of three diodes, the cathodes of one set of diodes being connected to points intermediate said inductors and capacitors respectively, the anodes of the other set of diodes being connected respectively to said points, and a pair of resistors through which the cathodes of the one set of diodes are connected to the positive supply line and the anodes of the other set of diodes are connected to the negative supply line respectively.

4. An electrical inverter circuit as claimed in claim 3 including inductors connected in series with said resistors respectively.

* * * * *